United States Patent [19]

Levine et al.

[11] Patent Number: 4,472,978
[45] Date of Patent: Sep. 25, 1984

[54] STABILIZED GYROCOMPASS

[75] Inventors: Seymour Levine, Woodland Hills, Calif.; Marvin Taylor, Lexington, Mass.

[73] Assignee: Sperry Corporation, New York, N.Y.

[21] Appl. No.: 268,594

[22] Filed: May 29, 1981

[51] Int. Cl.³ .............................................. G01C 19/38
[52] U.S. Cl. ....................................... 74/5.34; 33/321; 33/323; 74/5.6 E; 74/5.9
[58] Field of Search ................. 74/5.34, 5.47, 5.6 E, 74/5.9; 33/321, 323, 324, 326

[56] References Cited

U.S. PATENT DOCUMENTS

| 2,637,914 | 5/1953 | Rawlings | 74/5.34 X |
| 2,729,107 | 1/1956 | Braddon | 74/5.34 |
| 2,729,108 | 1/1956 | Vacquier et al. | 74/5.34 |
| 2,840,366 | 6/1958 | Wing | 264/1 |
| 2,949,785 | 8/1960 | Singleton et al. | 74/5.34 |
| 3,762,062 | 10/1976 | Johnston | 74/5.34 X |

FOREIGN PATENT DOCUMENTS 854506 11/1960 United Kingdom ................. 74/5.34

Primary Examiner—Rodney H. Bonck
Attorney, Agent, or Firm—Howard P. Terry

[57] ABSTRACT

In a stabilized gyrocompass having meridian seeking gyroscopic means and slaved horizontal gryoscopic means disposed upon a common platform, a signal representative of the angle which develops between the meridian seeking gyro and the platform in response to the dynamic effects of the vehicle is generated. The generated angle is proportional to the northerly inertial velocity term and is used to control the platform in azimuth, thereby providing a dynamically correct stabilized gyrocompass without the use of accelerometers or gravity sensors which are conventional in the art.

3 Claims, 3 Drawing Figures

STABILIZED GYROCOMPASS

BACKGROUND OF THE INVENTION

1. Field of the Invention

The invention relates generally to vehicular mounted stabilized gyroscopic instruments and specifically to a gyrocompass that provides both navigation data and stabilization data without the utilization of an accelerometer or separate gravity sensors.

2. Description of the Prior Art

Stabilized vehicular mounted gyrocompasses for providing both navigation data and stabilization data are not broadly new and have heretofore been taught, e.g., in U.S. Pat. No. 2,729,108, entitled "Control Systems for Gyroscopic Instruments", issued to Vacquier et al, issued on Jan. 3, 1956 and assigned to the Applicants' assignee. The apparatus disclosed in the Vacquier et al patent includes a pair of gyros of the directional type whose rotors normally spin about horizontal axes. The frames for the respective gyroscopic rotors are independently mounted on a common support. The frames for the rotors are interconnected by a slaving means adapted to maintain the spin axes of the rotors in mutually perpendicular relation. The instrument is provided with azimuthal directivity by gravity responsive means for the meridian gyro of the sensitive element whereby its horizontal spin axis is maintained in a north-south direction due to the effect thereon of the horizontal component of the earth's rotation. The slave gyro of the sensitive element includes a frame supporting a rotor whose horizontal spin axis points in an east-west direction. Both gyros are mounted in neutral equilibrium on a common support. The frames of both gyros are levelled with the spin axes of the rotors thereof in a horizontal plane as by means including electrolytic levels providing limited substantially linear signal outputs with tilt of the frames from a level condition. The support for the gyros includes an azimuth or phantom member with freedom about a vertical axis that is mounted on a platform having freedom relative to the mutually perpendicular pitch and roll axes of the craft. The azimuth member and platform are respectively positioned by an azimuth servomotor and pitch and roll servomotors. The platform and azimuth member are effectively stabilized by a follow-up control from the sensitive element of the gyroscopic instrument which includes the respective servomotors. Azimuth, pitch and roll data transmitters are also operated by the respective servomotors.

It is well known to those skilled in the art that in order for a gyrocompass of the type taught in the Vacquier patent to remain continuously pointing north in the presence of vehicular velocity and acceleration, compensation for these dynamic effects must normally be introduced. In the Vacquier patent this compensation is provided by a gravitationally responsive device having an electrolytic liquid which when coupled to an electronic processor means provides a signal representative of the acceleration of the vehicle in a north-south direction. Improvements in the art have resulted in accelerometers of the type taught in U.S. Pat. No. 2,840,366, entitled "Accelerometers", issued to W. G. Wing, on June 24, 1958, and assigned to the Applicants' assignee. Consequently, it is now conventional within the art to use an accelerometer which senses the northerly acceleration and which then integrates the acceleration signal to provide an inertia north velocity for precessing the meridian or north-seeking gyro about the east axis and for compassing the platform to the north. The compassing signal is ordinarily based upon a comparison between the inertial north velocity term and the northerly component of the vehicle's velocity.

The conventional stabilized gyrocompass incorporating accelerometers is relatively expensive, occupies on the order of 6½ cubic feet, and weighs on the order of 450 pounds. To date, it has been impractical to utilize such devices on small naval patrol craft. However, with the advent of smaller more sophisticated weapons systems requiring stabilization, there is a need for a less expensive and more compact stabilized gyrocompass. Accordingly, the practice of the present invention provides a less expensive and more compact stabilized gyrocompass which provides a simplified compensation means for vehicular velocity and acceleration and which does not use an accelerometer or separate gravity sensor and thus makes it feasible to incorporate stabilized gyrocompasses in small naval patrol craft.

SUMMARY OF THE INVENTION

A stabilized gyrocompass for providing navigation data and stabilization data is provided without the use of an accelerometer or separate gravity sensors. The apparatus includes first gyroscopic means having a pendulously supported meridian gyro whose spin axis is horizontal and points nominally north and second slaved non-pendulous gyroscopic means whose spin axis is horizontal and points east. The first and second gyroscopic means are mounted on a common platform which is slaved in azimuth via servomechanisms to the second gyroscopic means. The platform, controlled by the second gyroscopic means, does not move in azimuth relative to the first gyroscopic means, while the first gyroscopic means is permitted to move such that an angle results between the platform and the first gyroscopic means. The resulting angle is proportional to the northerly inertial velocity, and thus a signal representative of this northerly inertial velocity may be utilized to precess the first gyroscopic means about the east axis and may also be compared with the vehicular velocity for compassing and damping the platform in azimuth.

DESCRIPTION OF THE PREFERRED EMBODIMENTS

Figure 1:
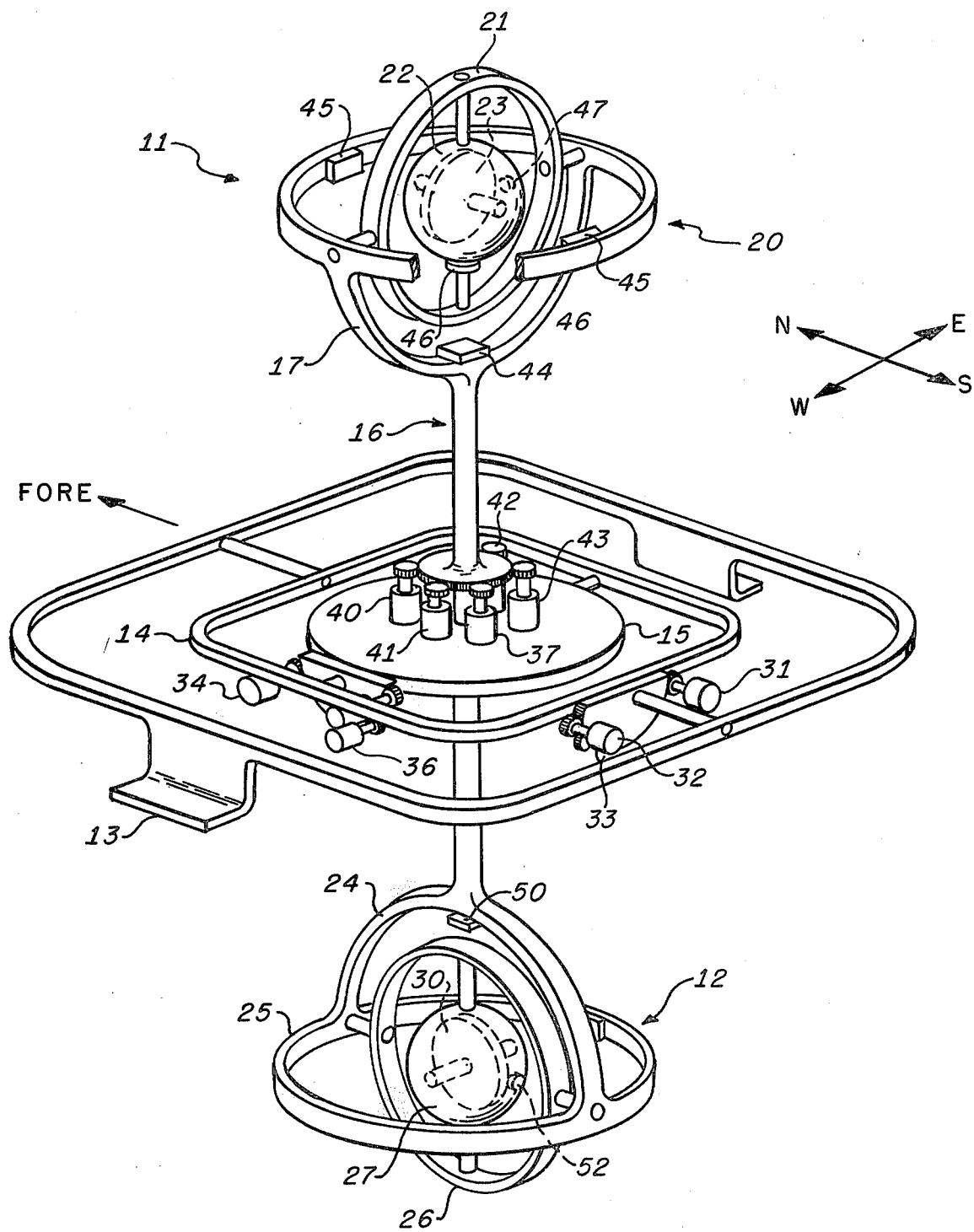
FIG. 1 is an illustration of a portion of a stabilized gyrocompass utilizing the present invention.

Referring now to FIG. 1, an illustration of a portion of a stabilized gyrocompass 10 utilizing the present invention is provided. A pair of perpendicular axes delineate north-south directions and east-west directions which are helpful in understanding the orientation of the first gyroscopic means 11 and second gyroscopic means 12, hereinafter described in greater detail. The first gyroscopic means 11 and the second gyroscopic means 12 are supported within a case or fixed gimbal ring 13 which is fixed with respect to the ship or other vehicle within which the stabilized gyrocompass 10 is utilized. A roll gimbal 14 is aligned along a roll gimbal axis which lies along or parallel to the fore-aft axis of the ship and the roll gimbal 14 is journalled to the fixed gimbal 13 to allow rotation of the roll gimbal with respect to the fixed gimbal ring about the fore-aft axis. The pitch gimbal or azimuth platform 15 is journalled within the roll gimbal 14 to allow rotation of the azimuth platform 15 about an axis perpendicular to the fore-aft axis thereby indicating the pitch of the ship. An azimuth gimbal 16 is journalled within the azimuth platform 15 to allow rotation of the azimuth gimbal 16 about an axis perpendicular to the plane of the azimuth platform 15. A first bifurcate extension or first yoke is disposed at one end of the azimuth gimbal 16 and fixedly attached to and supporting a circular frame 20. A second bifurcate extension 24 or second yoke is disposed at the opposite end of the azimuth gimbal 16 and in a plane perpendicular to the plane of the first bifurcate extension 17, and the second bifurcate extension is fixedly attached to and supporting a circular frame 25. The circular frames 20, 25 function as outer gimbals for the first gyroscopic means 11 and the second gyroscopic means 12, respectively.

The first gyroscopic means 11 which is a meridian seeking gyro and the second gyroscopic means which is slaved to the first gyroscopic means are preferably two axis directional gyros of a type well known in the art. Gyro elements 23, 30 are housed within gyrospheres 22, 27 which are on the order of 3½ inches in diameter. Preferably, the induction driven wheels or gyro elements 23, 30 operate at approximately 24,000 revolutions per minute in oil lubricated bearings. The gyrospheres 22, 27 are supported in a low viscosity halofluorocarbon oil with a specific gravity of approximately 1.8. The vertical axes of the gyrospheres 22, 27 are positioned by low-friction ball bearings mounted in vertical rings or inner gimbals 21, 26. The inner gimbals 21, 26 are journalled between the junction of the ends of the bifurcate extensions 17, 24 and the circular frames 20, 25, respectively. Enclosures (not shown) surround the frame 20 of the first gyroscopic means and frame 25 of the second gyroscopic means, and the interior volume of the enclosures are filled with the halofluorocarbon fluid to provide support for the gyrospheres 22, 27. The first gyroscopic means or meridian seeking gyro 11 whose spin axis is horizontal and points nominally north includes a pendulous weight 46 which is positioned between the surface of the gyrosphere 22 and the lower journal of the inner gimbal 21 to make it a meridian seeking gyro. Moreover, a damping weight 47 is affixed to the surface of the gyrosphere 22 to suppress the oscillations of the meridian gyro 11 about the meridian.

The speed with which the meridian gyro 11 settles to a level position (damping percentage) can be changed by varying the damping weight 47. The second gyroscopic means or slave gyro 12 whose spin axis is horizontal and points east includes an erection weight 52 which is affixed to the surface of the gyrosphere 27 to produce a slight unbalance along the horizontal input axis (cross-tilt axis which is oriented along the north-south axis).

Control means for the meridian gyro 11 and the slave gyro 12 is provided by two axis torquers 44, 50, respectively. The two axis torquer 44 for the meridian gyro 11 is positioned at the first bifurcate extension 17 of the azimuth gimbal 16 to produce rotation of the inner gimbal 21 about the axis between the end of the bifurcate extension 17 and also to produce rotation of the gyrosphere 22 about the inner gimbal axis. The two axis torquer 50 for the slave gyro is positioned at the second bifurcate extension 24 to produce rotation of the inner gimbal 26 about the axis between the ends of the second bifurcate extension 24 and to produce rotation of the gyrosphere 27 about the inner gimbal axis. Preferably, the two axis torquers 44, 50 are of a type of d.c. torquer well known in the art that reacts in a field produced by a permanent magnet. Each pair of torquers 44, 50 is used to torque each gyro 11, 12 about two axes. The torque about the horizontal axes is proportional to the sum of the torquing currents; whereas the torque about the vertical axes is proportional to the difference in torquing currents. Each magnet assembly of the torquers 44, 50 is self shielded to present a monopole to the surrounding environment.

Control means for the meridian gyro 11 and the slave gyro 12 further includes two axis inductive pick-offs 45, 51 respectively. The two axis pick-off 45 for the meridian gyro 11 includes two induction means oppositely disposed on the inner surface of the circular frame 20 at each end of the spin axis of the first gyro wheel 23 to sense angular deviations of the gyrosphere 22 about horizontal and vertical axes. Pick-off coils (not shown) are disposed upon the gyro case. The two axis pick-off 51 for the slave gyro 12 also includes two induction means oppositely disposed on the inner surfaces of the circular frame 25 at each end of the spin axis of the second gyro wheel 30 to sense angular deviation of the gyrosphere 27 about horizontal and vertical axes. Pick-off coils (not shown) are disposed upon the gyro case.

The platform servosystem illustrated in FIG. 1 is preferably a 400 Hz suppressed carrier design utilizing a plurality of size 15 control motors to drive the three axes of the stabilized gyro compass 10 through appropriate gearing. A first control motor or roll servomotor 31 is coupled to the roll gimbal 14 to rotate the roll gimbal 14 about the roll gimbal axis in response to a roll torquer feedback signal. A second control motor or pitch servomotor 34 is coupled to the pitch gimbal 15 to rotate the pitch gimbal about the pitch gimbal axis in response to a pitch torquer feedback signal. A third control motor or azimuth servomotor 37 is coupled to the azimuth gimbal 16 to rotate the azimuth gimbal about the azimuth gimbal axis in response to an azimuth torquer feedback signal. Moreover, synchro data is derived through appropriate gearing, from each axis for transmission to external equipment. A roll data synchro 32 which has a 2X relative shaft speed and a roll data synchro 33 which has a 36X relative shaft speed are utilized for sensing displacement of the roll gimbal 14 about the roll gimbal axis and for producing respective output signals. A pitch data synchro 35 which has a 2X relative shaft speed and a pitch data synchro 36 which has a 36X relative shaft speed are utilized for sensing the displacement of the pitch gimbal 15 about the pitch gimbal axis and for producing respective output signals. An azimuth data synchro 40, which has a 1X relative shaft speed and an azimuth data synchro 41 which has a 36X relative shaft speed are utilized for sensing the displacement of the azimuth gimbal 16 about the azimuth gimbal axis for producing with respective output signals. Additionally, a pair of resolvers 42, 43 which are geared 1:1 and disposed upon the azimuth platform 15 are provided for internal system use.

Figure 2A:
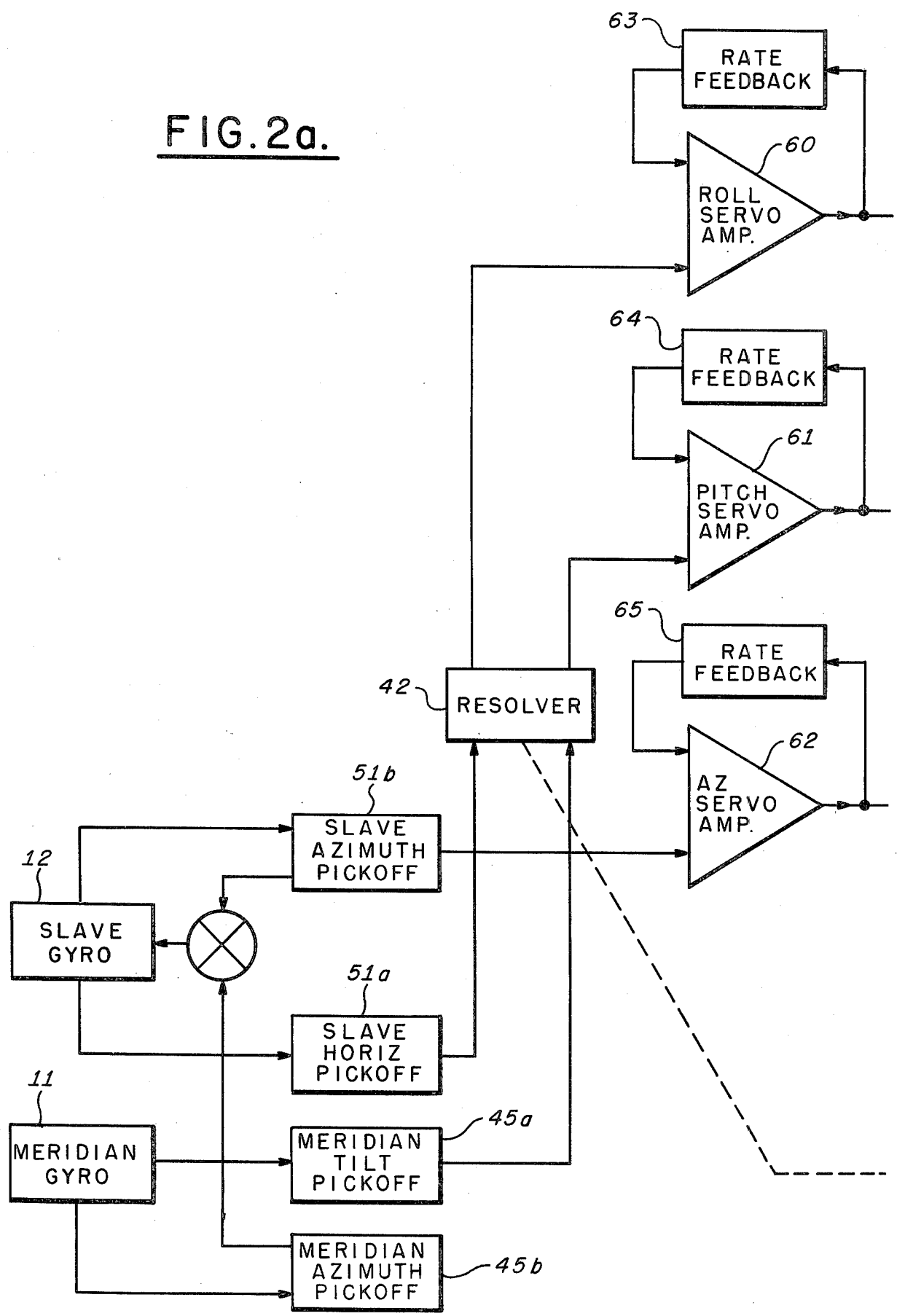
FIGS. 2a and 2b are block diagram of the electronic and mechanical components necessary to practice the present invention.
Figure 2B:
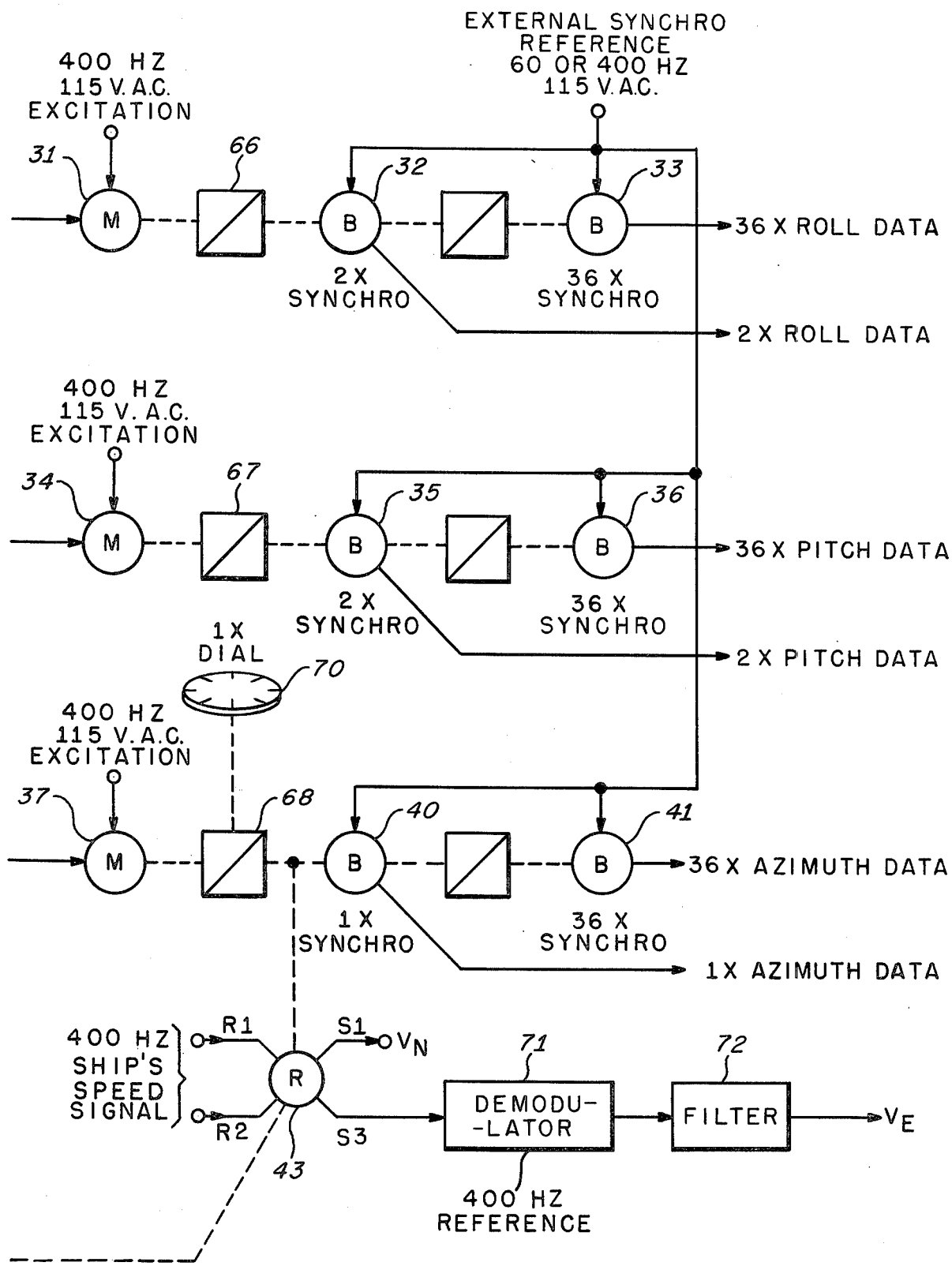

Referring now to FIG. 2, a block diagram of electronic and mechanical components necessary to practice the present invention is provided. It should be noted that the resolvers 42, 43; the servomotors 31, 34 and 37; and the synchros 32, 33, 35, 36, 40 and 41 are illustrated in FIG. 1 and depicted in block form in FIG.

2. The heading resolver 42 converts the tilt and cross tilt information from a meridian gyro azimuth pick-off 45a and a slave gyro pick-off 51b to roll and pitch signals and provides these roll and pitch signals to a roll servo-amplifier 60 and a pitch servoamplifier 61. Thus, the roll servo 31 and pitch servo 34 are closed around the gyro tilt and cross tilt pick-offs 45a, 51a. The azimuth servo loop is closed around the slave gyro azimuth pick-off 51b which provides an input to the azimuth servoamplifier 62 and maintains the platform azimuth in alignment with the slave gyro 12. The three platform servomotors 31, 34, and 37 are driven by the identical servoamplifiers 60, 61, and 62 each of which includes internal rate feedback means 63, 64 and 65, respectively, for damping purposes. The servomotors 31, 34, and 37 are coupled to synchros 32, 35, and 40 via appropriate gear means 66, 67, and 68, respectively. The gear means 68 is coupled to a heading dial 70 and the speed resolver 71. The speed resolver 43 receives two input signals, a 400 Hz reference signal and a speed signal from the ship's log. The output signals from the speed resolver 43 are signals representative of the ship's northerly velocity, $V_N$, and the ship's easterly velocity $V_E$. The easterly velocity signal $V_E$ is preferably passed through a demodulator 71 and a filter 72 for use as a latitude correction term in a manner well known in the art. The synchros 33, 36, and 41 are coupled to synchros 32, 24, and 40 via appropriate gearing, respectively, and thus, the synchros may be utilized to transmit stabilization data to external equipment.

In operation, the uppermost meridian gyro 11 is the north-seeking component and also serves as the tilt (east) axis reference element. The lower slave gyro 12 is the cross-tilt (north) axis reference and also normally acts as a mechanical filter in azimuth between the meridian gyro 11 and the platform 15. The meridian gyro 11 is mechanically pendulous and inherently seeks north by means of classical compassing dynamics. The compass oscillation in azimuth is damped by torque feedback from the meridian gyro azimuth pick-off 45b and compensation for earth's rate, ship's velocity, and ship's acceleration are automatically and continuously inserted by way of the electrical torquers 44 on the meridian gyro 11. The output of the meridian gyro azimuth pick-off 45b is used to torque the slave gyro 12 towards azimuth alignment with the meridian gyro 11 while the output of the meridian gyro tilt pick-off 45a drives the azimuth platform in tilt by means of the heading resolver 42 and the roll and pitch servos 31, 34. The slave gyro 12 is aligned on the platform 15 with its spin axis 90 degrees from that of the meridian gyro; therefore, when the platform is settled to north, its spin axis is east-west. The slave gyro 12 is slightly unbalanced along the north-south (cross tilt) axis so that it can sense platform errors in cross tilt and provide erection to the vertical about this axis. The slave gyro horizontal axis pick-off 51a controls the platform servos 31, 34 in cross tilt and the azimuth axis pick-off 51a also controls the platform azimuth servo 37. In addition, the azimuth pick-offs 45b, 51b are continuously compared and the difference used to torque the slave gyro 12 to eliminate the difference in their values. This difference is proportional to the inertial north velocity and in effect is used to precess the meridian gyro 11 about the east axis to compare with the ship's log speed for compassing and damping the platform 15 in azimuth.

The generation of the inertial north velocity also serves another important function. All gyrocompasses develop errors in azimuth as a function of error in ship's speed data (about 4 arc minutes per knot at mid-latitudes). During maneuvers the accuracy of the ship's velocity log degrades sharply while that of the inertial velocity remains unchanged. As a result the transient compass error due to the ship's maneuver is substantially eliminated. Furthermore, the system is protected against intercardinal rolling error by the stabilization in cross tilt from the slave gyro 12. The meridian gyro 11, however, will experience small oscillations in azimuth due to ship's rolling, but the platform 15 will not follow these motions since it is tracking the slave gyro 12. The torquing loop in azimuth, therefore, preferably has a time constant which effectively filters the platform from following these perturbations.

In summary, the meridian gyro 11 being pendulous will precess in azimuth in response to northerly acceleration. The angle of precession will be the integral of the acceleration and hence will be, directly the north velocity term. The meridian gyro 11, therefore, serves a dual function as the reference gyro and also as an integrating accelerometer in the North direction. The platform 15, controlled by the slave gyro 12, does not move in azimuth while the meridian gyro 11 is permitted to develop an angle between the platform 15 and the gyro. This angle is proportional to northerly inertial velocity. As a result, a dynamically correct stabilized gyrocompass may be built without the use of accelerometers or gravity sensors which are conventional in the art.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A stabilized gyrocompass comprising:
   a platform;
   pendulously supported gyroscopic means mounted on said platform for azimuthal precession in response to accelerations of said platform;
   a signal generation means;
   non-pendulously supported slaved gyroscopic means for controlling said platform, fixedly attached to said platform and coupled to said signal generation means whereby said signal generation means provides a torquing signal representative of an angle between said platform and said pendulously supported gyroscopic means.

2. A stabilized gyrocompass as recited in claim 1 wherein said signal generation means includes azimuth pick-off means coupled to said pendulously supported and non-pendulously supported gyroscopic means for providing signals representative of respective azimuth positions thereof.

3. A stabilized gyrocompass as recited in claim 2 wherein said signal generating means further includes signal comparison means coupled to receive said signals representative of said azimuth positions of said pendulously supported and non-pendulously supported gyroscopic means for providing said torquing signal.

* * * * *